(12) United States Patent
Zadorojniy

(10) Patent No.: US 11,487,922 B2
(45) Date of Patent: Nov. 1, 2022

(54) OPTIMIZING CONTROL ACTIONS OF A CONTROL SYSTEM VIA AUTOMATIC DIMENSIONALITY REDUCTION OF A MATHEMATICAL REPRESENTATION OF THE CONTROL SYSTEM

(71) Applicant: International Business Machines Corporation, Armonk, NY (US)

(72) Inventor: Alexander Zadorojniy, Haifa (IL)

(73) Assignee: International Business Machines Corporation, Armonk, NY (US)

(*) Notice: Subject to any disclaimer, the term of this patent is extended or adjusted under 35 U.S.C. 154(b) by 416 days.

(21) Appl. No.: 16/871,903

(22) Filed: May 11, 2020

(65) Prior Publication Data
US 2021/0350049 A1 Nov. 11, 2021

(51) Int. Cl.
| | | |
|---|---|---|
| G05B 13/00 | (2006.01) | |
| G06F 30/27 | (2020.01) | |
| G05B 13/02 | (2006.01) | |
| G05B 13/04 | (2006.01) | |
| G06N 20/00 | (2019.01) | |
| G06F 17/16 | (2006.01) | |

(Continued)

(52) U.S. Cl.
CPC ......... *G06F 30/27* (2020.01); *G05B 13/0265* (2013.01); *G05B 13/048* (2013.01);
(Continued)

(58) Field of Classification Search
None
See application file for complete search history.

(56) References Cited

U.S. PATENT DOCUMENTS

2009/0210363 A1 8/2009 Grabarnik et al.
2014/0333832 A1 11/2014 Knee
(Continued)

FOREIGN PATENT DOCUMENTS

CN 107741738 2/2018

OTHER PUBLICATIONS

"Written Opinion of the International Searching Authority", dated Jul. 29, 2021, International Application No. PCT/IB2021/053270, 6 pages.

(Continued)

*Primary Examiner* — Paul B Yanchus, III
(74) *Attorney, Agent, or Firm* — Barry D. Blount

(57) ABSTRACT

A method for automatically reducing the dimensionality of a mathematical representation of a controlled application system is provided. The method includes receiving, at a control system, data corresponding to control action and system state variables relating to the controlled application system, fitting a constrained reinforcement learning (CRL) model to the controlled application system based on the data, and automatically identifying a subset of the system state variables by selecting control action variables of interest and identifying system state variables that drive the CRL model to recommend each control action variable of interest. The method also includes automatically performing state space dimensionality reduction of the CRL model using the subset of system state variables, estimating a transition probability matrix for a constrained Markov decision process (CMDP) model of the controlled application system, and formulating the CMDP model as a linear programming (LP) problem using the transition probability matrix and several costs.

20 Claims, 2 Drawing Sheets

(51) Int. Cl.
*G06N 7/00* (2006.01)
*G06F 111/04* (2020.01)
*G06F 111/10* (2020.01)

(52) U.S. Cl.
CPC ............ *G06F 17/16* (2013.01); *G06N 7/005* (2013.01); *G06N 20/00* (2019.01); *G06F 2111/04* (2020.01); *G06F 2111/10* (2020.01)

(56) References Cited

U.S. PATENT DOCUMENTS

| | | | |
|---|---|---|---|
| 2015/0226049 A1* | 8/2015 | Frangos | E21B 49/00 |
| | | | 702/6 |
| 2017/0061309 A1* | 3/2017 | Wasserkrug | G06Q 40/12 |
| 2018/0129974 A1 | 5/2018 | Giering et al. | |
| 2019/0279081 A1 | 9/2019 | Pham et al. | |
| 2022/0028001 A1* | 1/2022 | Wachell | G06Q 40/00 |

OTHER PUBLICATIONS

Bohez, Steven et al. "Value Constrained Model-Free Continuous Control," arXiv:1902.04623v1 [cs.RO], Feb. 12, 2019, 12 pages.
Prestwich, S.D et al., "Stochastic Constraint Programming as Reinforcement Learning," arXiv:1704.07183v1 [cs.AI], Apr. 24, 2017, 10 pages.

\* cited by examiner

OPTIMIZING CONTROL ACTIONS OF A CONTROL SYSTEM VIA AUTOMATIC DIMENSIONALITY REDUCTION OF A MATHEMATICAL REPRESENTATION OF THE CONTROL SYSTEM

BACKGROUND

The present disclosure relates to the field of machine learning. More specifically, the present disclosure relates to optimizing control actions of a control system that directs the operation of a controlled application system by automatically reducing the dimensionality of a mathematical representation of the controlled application system.

SUMMARY

According to an embodiment described herein, a method is provided for automatically reducing a dimensionality of a mathematical representation of a controlled application system that is subject to one or more constraint values. The method includes receiving, at a control system that directs an operation of the controlled application system, data corresponding to control action variables and system state variables relating to the controlled application system, and fitting, via a processor of the control system, a constrained reinforcement learning (CLR) model to the controlled application system based on the data corresponding to the control action variables and the system state variables. The method also includes automatically identifying, via the processor, a subset of the system state variables by selecting control action variables of interest and, for each control action variable of interest, identifying system state variables that drive the CRL model to recommend the control action variable of interest. The method further includes automatically performing, via the processor, state space dimensionality reduction of the CRL model using the subset of the system state variables, estimating, via the processor, a transition probability matrix for a constrained Markov decision process (CMDP) model of the controlled application system subject to the one or more constraint values after state space dimensionality reduction, and formulating, via the processor, the CMDP model as a linear programming (LP) problem using the transition probability matrix, one or more cost objectives, and one or more constraints-related costs.

In another embodiment, a control system that directs an operation of a controlled application system that is subject to one or more constraint values is provided. The control system includes an interface for receiving data corresponding to control action variables and system state variables relating to the controlled application system. The control system also includes a processor and a computer-readable storage medium. The computer-readable storage medium stores program instructions that direct the processor to fit a CRL model to the controlled application system based on the data corresponding to the control action variables and the system state variables, and automatically identify a subset of the system state variables by selecting control action variables of interest and, for each control action variable of interest, identifying system state variables that drive the CRL model to recommend the control action variable of interest. The computer-readable storage medium also stores program instructions that direct the processor to automatically perform state space dimensionality reduction of the CRL model using the subset of the system state variables, estimate a transition probability matrix for a CMDP model of the controlled application system subject to the one or more constraint values after state space dimensionality reduction, and formulate the CMDP model as an LP problem using the transition probability matrix, one or more cost objectives, and one or more constraints-related costs.

In yet another embodiment, a computer program product is provided for automatically reducing the dimensionality of a mathematical representation of a controlled application system that is subject to one or more constraint values. The computer program product includes a computer-readable storage medium having program instructions embodied therewith, wherein the computer-readable storage medium is not a transitory signal per se. The program instructions are executable by a processor to cause the processor to fit a CRL model to the controlled application system, wherein the CRL model is based on data corresponding to the control action variables and the system state variables, and automatically identify a subset of the system state variables by selecting control action variables of interest and, for each control action variable of interest, identifying system state variables that drive the CRL model to recommend the control action variable of interest. The program instructions are also executable by the processor to cause the processor to automatically perform state space dimensionality reduction of the CRL model using the subset of the system state variables, estimate a transition probability matrix for a CMDP model of the controlled application system subject to the one or more constraint values after state space dimensionality reduction, and formulate the CMDP model as an LP problem using the transition probability matrix, one or more cost objectives, and one or more constraints-related costs.

DETAILED DESCRIPTION

Figure 1:
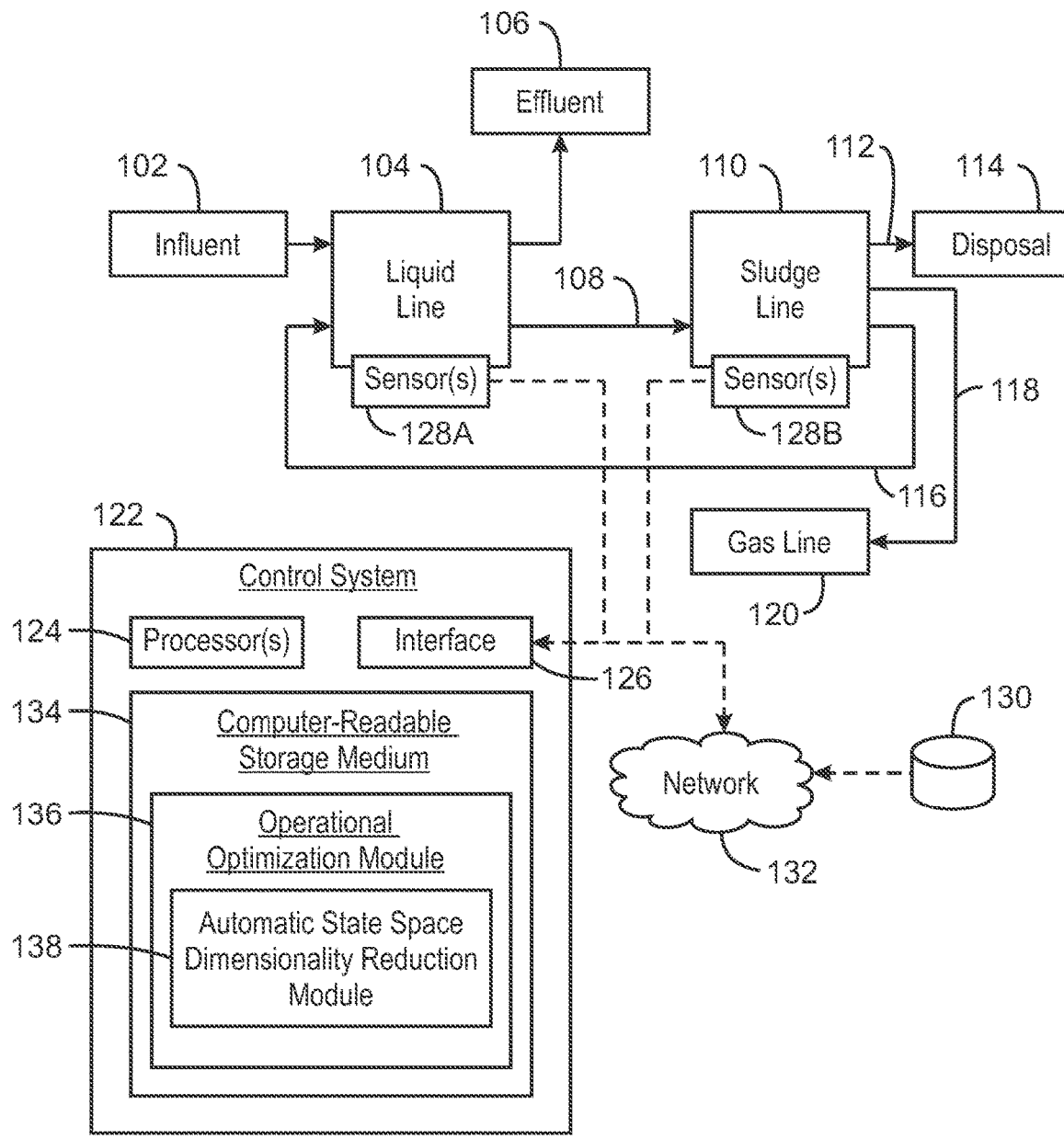
FIG. 1 is a simplified block diagram of an example wastewater treatment plant (WWTP) for which the automatic state space dimensionality reduction techniques described herein may be implemented.

Machine learning techniques are commonly used for operational optimization of control systems relating to various different types of controlled application systems, such as, for example, wastewater treatment plants, health care systems, agriculture systems, water resource management systems, queuing systems, epidemic process systems, robotic motion planning systems, and the like. More specifically, machine learning techniques are used to generate models that mathematically describe the operation of such controlled application systems. For example, reinforcement learning (RL) techniques may be used to learn policies that map the system state of a particular controlled application system with respect to its environment to the control actions taken by an operator of the control system relating to that controlled application system in a sequence that maximizes a notion of cumulative reward. An extension of reinforcement learning, called deep reinforcement learning (DRL), harnesses deep neural networks to model the client's/problem's environment behavior. Moreover, when a constraint is imposed on the operation of the controlled application system, constrained reinforcement learning (CRL) and/or constrained deep reinforcement learning (CDRL) techniques may be used to learn policies that take such constraints into account. In addition, Markov decision process (MDP) techniques involve a complex framework for decision making that utilizes explicitly calculated/estimated probabilities of transitioning between different system states in response to particular control actions. When constrained Markov decision process (CMDP) techniques are used, the model is controlled such that particular constraints relating to the controlled application system are met.

In operation, such controlled application systems often involve a very large number of possible system states, as well as a very large number of available control actions that can be taken by the respective control systems. For example, some controlled application systems involve hundreds of possible system state variables, as well as more than one hundred possible control actions. As a result, implementing constrained mathematical models for such controlled application systems may involve calculating many millions of transition probabilities values or learning very large neural networks. However, the control systems for these applications often do not have enough processing power to calculate such a large number of transition probability values in a reasonable time, and many controlled application systems do not include enough sensors to collect sufficient data to perform computations on this level. Moreover, when one or more constraints are imposed on a controlled application system, the constrained mathematical model becomes even more complex and difficult to compute. Therefore, it is often desirable to reduce the size of such constrained mathematical models.

Accordingly, the present disclosure describes techniques for automatically reducing the state space dimensionality of such constrained mathematical models by reducing the number of possible system states from thousands of variables to fewer than 10 or fewer than 20 variables, for example. This is accomplished using a combination of CMDP and CRL (or CDRL) techniques. The resulting simplified models allow a control system to quickly and efficiently optimize the operation of a controlled application system, while still accounting for one or more constraints imposed on the controlled application system.

The techniques described herein may be applied to any suitable types of controlled application systems, such as wastewater treatment plants, health care systems, agriculture systems, water resource management systems, queuing systems, epidemic process systems, robotic motion planning systems, and the like. However, for ease of discussion, embodiments described herein relate to the application of such techniques to wastewater treatment plants.

FIG. 1 is a simplified block diagram of an example wastewater treatment plant (WWTP) 100 for which the automatic state space dimensionality reduction techniques described herein may be implemented. The WWTP 100 may be any suitable type of wastewater treatment unit, device, or system that is configured to treat incoming wastewater, which is referred to as influent 102. The influent 102 travels through a liquid line 104 within the WWTP 100, which may include any number of screens, pumps, reactors, settling tanks, separation devices, air blowers, and the like, for treating the influent 102 to a level that is set according to local regulations or protocols. The two main outputs of the liquid line 104 are a treated fluid, referred to as effluent 106, and a treated biosolid, referred to as sludge 108. The sludge 108 is then run through a sludge line 110, which may include any number of screens, pumps, reactors, settling tanks, separation devices, dehydration systems, aeration tanks, air blowers and the like, for treating the sludge 108. The resulting treated sludge 112, which may include a filter cake, for example, is then sent out for disposal 114, while a recycle effluent 116, which may include activated sludge for use in a reactor, for example, is recycled back into the liquid line 104. In addition, methane gas 118 that was separated from the sludge 108 in the sludge line 110 may be sent to a gas line 120, where it may be sold or used for various purposes.

The WWTP 100 also includes a control system 122 that is configured to control the functioning of the various devices and systems within the WWTP 100, such as the screen(s), pump(s), reactor(s), settling tank(s), separation device(s), air blower(s), dehydration system(s), aeration tank(s), and the like that are included within the liquid line 104 and/or the sludge line 110. In various embodiments, the control system 122 of the WWTP 100 consists of one or more servers, one or more general-purpose computing devices, one or more special-purpose computing devices, and/or one or more virtual machines, for example. Moreover, the control system 122 includes one or more processors 124, as well as an interface 126 for receiving readings from a number of sensors within the WWTP 100, such as one or more sensor(s) 128A connected to the liquid line 104 and one or more sensor(s) 128B connected to the sludge line 110. The sensor(s) 128A and 128B may be used to monitor various conditions relating to the WWTP 100. For example, the sensor(s) 128A and 128B may be used to monitor flow variables, such as a total-nitrogen-at-effluent flow variable and a total-phosphorus-at-effluent flow variable. The readings may be received directly from the sensor(s), or may be received via a proxy or an input device.

The interface 126 may also be used for acquiring data from one or more databases 130 associated with the WWTP 100 via a network 132, such as, for example, the Internet, a local area network (LAN), a wide area network (WAN), and/or a wireless network. The network 132 may include associated copper transmission cables, optical transmission fibers, wireless transmission devices, routers, firewalls, switches, gateway computers, edge servers, and the like. The data acquired from the databases 130 may include information relating to the operational requirements of the WWTP 100, as well as historical operational data for the WWTP 100 or other similar WWTPs, for example.

The control system 122 also includes a computer-readable storage medium (or media) 134 that includes program instructions that may be executed by the processor(s) 124 to control the operation of the WWTP 100, as described further herein. The computer-readable storage medium 134 may be integral to the control system 122, or may be an external device that is connected to the control system 122 when in use. The computer-readable storage medium 134 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 134 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the interface 126 includes a network adapter card or network interface that receives program instructions from the network 132 and forwards the program instructions for storage in the computer-readable storage medium 134 within the control system 122.

The program instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The program instructions may execute entirely on the control system 122, partly on the control system 122, as a stand-alone software package, partly on the control system 122 and partly on a remote computer or server connected to the control system 122 via the network 132, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the techniques described herein.

In operation, the properties of the effluent 106 and the treated sludge 112 exiting the WWTP 100 must comply with regulatory constraints that are specific to the location of the WWTP 100. Such constraints may include, for example, limits on the total nitrogen concentration and the total phosphorus concentration of the effluent 106 over specific time periods. An example of such a constraint is an upper limitation of 15 milligrams per liter (mg/L) for the monthly (or daily) average total nitrogen concentration in the effluent 106. To treat the effluent 106 and the treated sludge 112 to such an extent, multiple steps are carried out within the liquid line 104 and the sludge line 110. For example, the liquid line 104 may include various different types of equipment for treating the influent 102 via biological-physical and/or chemical sub-processes, as well as equipment for treating the influent 102 via any number of iterative sub-processes, such that the same influent portion visits some of the sub-processes multiple times.

To comply with such constraints, the control system 122 may be used to control various control action variables and system state variables relating to the WWTP 100. As used herein, the term "control action" refers to a possible action taken by a control system to control the operation of a controlled application system, while the term "system state" refers to a possible state of the controlled application system after the control system has taken one or more control actions. Examples of system state variables include the following: (1) operating at an influent flow rate (in cubic meters per hour ($m^3$/hr)) of low, medium, or high; (2) operating with one or more feedback or recycle loops set to an on or off setting; (3) operating with the upper limit on the total nitrogen concentration (in mg/L) and/or the total phosphorus concentration (in mg/L) of the effluent 106 set to low, medium, or high; (4) operating with a time period relating to the electricity cost set to an expensive, medium, or cheap setting; and (5) operating with a total operational cost set to low, medium, or high. Examples of control action variables include the following: (1) increasing or decreasing the speed of one or more air blowers within the WWTP 100; (2) increasing or decreasing the amount of chemicals being added to the liquid line 104 and/or the sludge line 110 within the WWTP 100; (3) increasing or decreasing the pumping rate (in $m^3$/hr) for one or more pumps within the WWTP 100; and (4) controlling feedback equipment within the WWTP 100, such as the feedback equipment that is used to send the recycle effluent 116 back into the liquid line 104.

As a result of this complexity, WWTPs typically have high operating costs. The total operating costs may include, for example, electricity costs required to operate the components within the WWTP 100, costs for various chemicals used within the wastewater treatment process, and disposal costs for the resulting treated sludge 112. Today, most WWTPs are operated in a conservative and inefficient risk-adverse mode, without the ability to quantify risks or truly optimize costs. Some sub-processes are optimized locally; however, a local optimum of a certain sub-process may have a negative effect on one or more other sub-processes which are not taken into account. Such local optimization may even have an adverse effect on the process as a whole.

As a result, the computer-readable storage medium 134 of the control system 122 includes an operational optimization module 136. The operational optimization module 136 is configured to generate a mathematical representation of the WWTP 100 that can be used to choose control actions that maximize the operational efficiency and minimize the operational costs of the WWTP 100, while accounting for one or more imposed constraints.

In operation, a CMDP model relating to the WWTP 100 involves a high degree of complexity due to the large number of variables associated with the wastewater treatment process. For example, the WWTP 100 may involve hundreds of possible system state variables, as well as more than 100 possible control actions that can be taken by the control system 122. As a result, implementing CMDP models for the WWTP 100 may include calculating or estimating more than $2^200 \times 100$ transition probability values. However, the control system 100 may not have enough processing power to calculate such a large number of transition probability values in a reasonable time. Moreover, the WWTP 100 only includes a limited number of sensors 128A and 128B. For example, the entire WWTP 100 may only include 5-10 sensors. As a result, the control system 122 may be unable to collect sufficient data to perform computations on this level. Furthermore, because constraints are imposed on the WWTP 100, the CMDP model becomes even more complex and difficult to compute.

As a result, according to embodiments described herein, the operational optimization module 136 within the computer-readable storage medium 134 of the control system 122 includes a sub-module, referred to as an automatic state space dimensionality reduction module 138. The automatic state space dimensionality reduction module 138 includes instructions that direct the processor(s) 124 to automatically reduce the state space dimensionality of a CRL model relating to the WWTP 100 by reducing the number of possible system states used within the CRL model from thousands of variables to fewer than 10 or fewer than 20 variables, for example. This, in turn, simplifies the transition probability matrix for a CMDP model of the controlled application system, allowing the CMDP model to be formulated as a linear programming (LP) problem. The control system 122 can then use the LP problem to quickly and efficiently control the operation of the WWTP 100, while adequately accounting for the imposed constraints.

It is to be understood that the block diagram of FIG. 1 is not intended to indicate that the WWTP 100 (or the control system 122 within the WWTP 100) is to include all of the components shown in FIG. 1. Rather, the WWTP 100 (and/or the control system 122) may include any number of additional or alternative components not shown in FIG. 1. For example, the computer-readable storage medium 134 of the control system 122 may include any number of additional modules for controlling and/or optimizing the operation of the WWTP 100. In addition, the control system 122 may include and/or be connected to a simulation system that provides simulated data relating to the operation of the WWTP 1000. In some embodiments, the control system 122 may use a combination of simulated data and data acquired from the sensors 128A and 128B to optimize the operation of the WWTP 100.

Reference is now made to a mathematical explanation of CMDP techniques that may be used according to embodiments described herein. A CMDP is defined as a 5-tuple<S, U, P, c, $\bar{d}$>, where S is a finite set of system states ($|S|=n$), U is a finite set of control actions ($|U|=k$), P denotes a transition probability function ($X^2 \times U \rightarrow [0; 1]$), c denotes a cost function ($X \times U \rightarrow R$) that includes a vector of costs per state-action pair, and $\bar{d}$ denotes a vector of costs related to constraints. The finite set of system states, S, is denoted as $<s_1, s_2, \ldots s_s> \in S$, where an element from S is a vector, and the finite set of control actions, U, is denoted as $<u_1, u_2, \ldots u_u> \in U$, where an element from U is a vector. The transition probability function, P, is denoted by $P(s_j|s_i, u_k) \in [0, 1]$. Moreover, $s_t$ is a random variable that represents the state at time t, and $u_t$ is a random variable that represents an action at time t.

The transition probability function, P(y|x, u), quantifies the probability of transitioning from one system state, x, to another system state, y, when an action, u, is chosen. A cost associated with selecting the action u when in system state x equals c(x,u). Based on the different probabilities and outcomes, policies, $\pi$, are generated, where each policy induces a probability measure over the state-action pairs. The goal of the CMDP model is to find a policy, $\pi$, that minimizes the overall cost, C($\pi$), while ensuring the total value of the constraint, $\bar{D}$, remains below a specified value.

For a CMDP discounted cost model, the parameter $\beta \in (0, 1)$ specifies a rate by which future costs are reduced, where $p^\pi(x_t=x; u_t=u)$ denotes a probability of the event $x_t=x$ and $u_t=u$ when the initial state equals $x_0$ and the policy is $\pi$. According to this model, the discounted occupation measure is defined as shown in Eq. (1), where ($0<\beta<1-$(discount factor)).

$$x_{s_0}^\pi(s,u)=(1-\beta)\Sigma_{t=0}^\infty \beta^t P_{s_0}^\pi(s_t=s,u_t=u) \quad (1)$$

The expectation of cost at time t with policy $\pi$ is defined as shown in Eq. (2).

$$\pi:S \rightarrow U, E_t^\pi[c(s_t,u_t)]=\Sigma_{s \in S, u \in U} c(s,u) P_{s_0}^\pi(s_t=s,u_t=u) \quad (2)$$

The cost is defined as shown in Eq. (3), where ($0<\beta<1$ (discount factor)).

$$C_{s_0}(\pi)=(1-\beta)\Sigma_{t=0}^\infty \beta^t E_t^\pi[c(s_t,u_t)]=\Sigma_{(s \in S, u \in U)} c(s,u) x_{s_0}^\pi(s,u) \quad (3)$$

The constraints, $\bar{D}(\pi)$, are defined similarly, as shown in Eq. (4).

$$D_{s_0}(\pi)=(1-\beta)\Sigma_{t=0}^\infty \beta^t E_t^\pi[d(s_t,u_t)]=\Sigma_{(s \in S, u \in U)} d(s,u) x_{s_0}^\pi(s,u) \quad (4)$$

As mentioned above, the goal of CMDP techniques is to find a policy, $\pi$, that minimizes the overall cost C($\pi$) while ensuring that the total value of the constraint, $\bar{D}$, remains below a specified value. The resulting policy, $\pi$, can be used for the operational optimization of a controlled application system. However, as described with respect to the example shown in FIG. 1, many controlled application systems involve an exceedingly large number of possible system states and possible control actions. This large number of variables results in the generation of highly-complex models that cannot be solved in a reasonable time. Accordingly, embodiments described herein provide an automatic state space dimensionality reduction technique that can be used to quickly and efficiently reduce the size of CMDP models by automatically selecting subsets of the system state variables that are of greatest importance for each CMDP model. In various embodiments, this is accomplished using a combination of CRL (or CDRL) and CMDP techniques, as described in more detail with respect to FIG. 2. Moreover, after state space dimensionality reduction, the CMDP model may be formulated as a linear programming (LP) problem that can be quickly and efficiently solved by typical solvers, such as the IBM CPLEX® Optimizer.

Figure 2:
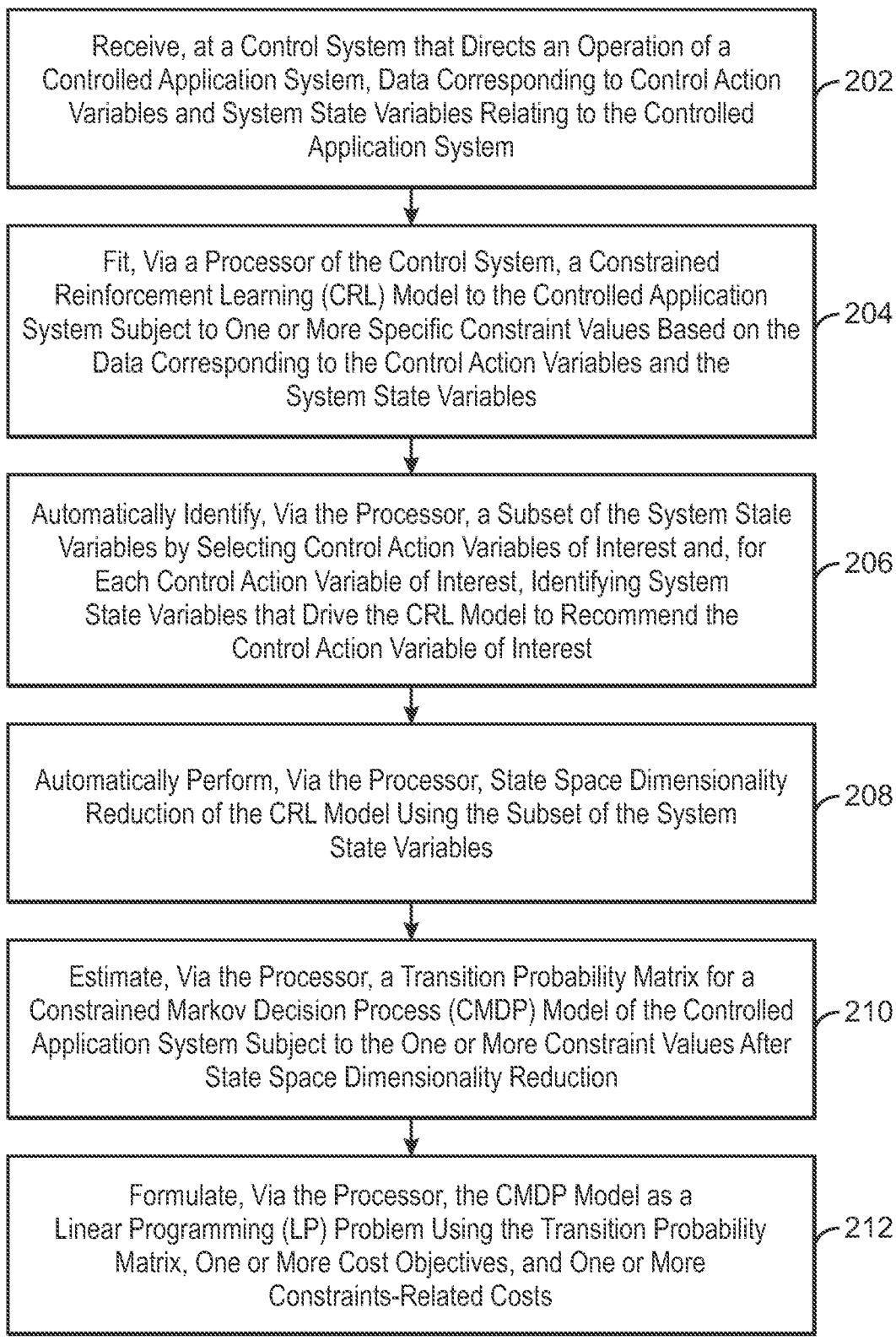
FIG. 2 is a process flow diagram of a method for automatically reducing the dimensionality of a mathematical representation of a controlled application system that is subject to one or more constraint values.

FIG. 2 is a process flow diagram of a method 200 for automatically reducing the dimensionality of a mathematical representation of a controlled application system that is subject to one or more constraint values. The method 200 is implemented by a control system that directs the operation of the controlled application system. In some embodiments, the controlled application system is a WWTP, such as the WWTP 100 described with respect to FIG. 1, and the control system includes a processor and a computer-readable storage medium that contains program instructions for directing the processor to perform the steps of the method 200. Moreover, in other embodiments, the controlled application system may be a health care system, an agriculture system, a water resource management system, a queuing system, an epidemic process system, a robotic motion planning system, or any other suitable type of controlled application system.

The method 200 begins at block 202, at which the control system receives data corresponding to control action variables and system state variables relating to the controlled application system. In some embodiments, at least a portion of the data is computed via sensors coupled to the controlled application system. Moreover, in some embodiments, the control system computes at least a portion of the data based on simulations of the controlled application system.

As described herein, the control action variables include a large number of possible actions that the control system can perform to control the operation of the controlled application system, and the system state variables include a large number of possible states of the controlled application system after the control system has performed one or more actions. In various embodiments, optimizing the control actions of the control system involves solving a large-sized stochastic problem relating to the relationship between the control action variables and the system state variables. Moreover, the large-sized stochastic problem takes into account a cost function relating to the controlled application system, as well the one or more constraint values for the controlled application system.

At block 204, a processor of the control system fits a constrained reinforcement learning (CRL) model to the controlled application system based on the data corresponding to the control action variables and the system state variables. In other words, the processor of the control system considers the large-sized stochastic problem in a machine learning framework, and outputs a CRL model that best describes the operation of the controlled application system in view of the one or more constraint values, the control action variables, and the system state variables that define the problem. In some embodiments, the CRL model is a constrained deep reinforcement learning (CDRL) model.

In various embodiments, the model fitting process includes performing standard reinforcement learning techniques which are known in the art, such as parameter adjustment and optimization, to generate a policy $\pi: S \times U \rightarrow [0,1]$. The policy is a map that provides a probability, P, commonly between 0 and 1, that control action, u, will be taken when the environment of the controlled application system indicates a system state, s: $P_{s_0}^\pi(s=s_t, u=u_t)$. The policy may be stationary, i.e., time-independent, or non-stationary, i.e., time-dependent, as known in the art. Moreover, based on the policy, joint probabilities of specific pairs of system state variables and control action variables, i.e., state-action pairs, may be calculated as $P_{s_0}^\pi(s=s_t, u=u_t) = P_{s_0}^\pi(s=s_t|u=u_t) \times P_{s_0}^\pi(s=s_t)$, where $P_{s_0}^\pi(s=s_t)$ is calculated based on the data received by the control system.

In various embodiments, the policy for the CRL (or CDRL) model is implicit. Specifically, given a system state as the input for the CRL (or CDRL) model, a distribution of control actions (or most-probable control actions) is provided as an output. Since the overall number of system states can be enormous or even infinite, a policy is not normally calculated explicitly. Instead, CRL (and CDRL) processes perform as kind of an "oracle". However, according to embodiments described herein, the probabilities can be estimated during the fitting process using data received at the input, thus providing an implicit policy.

One specific process that may be used to generate the policy for the CRL (or CDRL) model is referred to as the reward constrained policy optimization (RCPO) process. This process is described in a paper entitled "Reward Constrained Policy Optimization," by Tessler, Mankowitz, and Mannor (2018). As described therein, for constrained optimization problems, the task is to find a policy that maximizes a target function, $f(x)$, while satisfying an inequality constraint, $g(x) \leq \alpha$. The RCPO algorithm accomplishes this by incorporating the constraint into the reward function as a penalty signal. The penalty signal guides the policy towards a constraint-satisfying solution.

More specifically, for the RCPO algorithm, the large-sized stochastic problem is first formulated using the Lagrange relaxation technique, which involves converting the constrained optimization problem into an equivalent unconstrained optimization problem. A penalty term is added for infeasibility, such that infeasible solutions are sub-optimal. As a result, given a CMDP-based model, the unconstrained optimization problem is defined as shown in Eq. (5), where L is the Lagrangian and $\lambda \geq 0$ is the Lagrangian multiplier (a penalty coefficient.

$$\min_{\lambda \geq 0} \max_\theta L(\lambda, \theta) = \min_{\lambda \geq 0} \max_\theta [J_R^{\pi\theta} - \lambda \times (J_C^{\pi\theta} - \alpha)] \quad (5)$$

The goal of Eq. (5) is to find a saddle point, $(\theta^*(\lambda^*), \lambda^*)$, that is a feasible solution, where a feasible solution is one that satisfies $J_C^{\pi\theta} \leq \alpha$.

Next, the gradient is estimated. Specifically, the data relating to the control action variables and the system state variables are used to define an algorithm for the constrained optimization problem, as shown in Eqs. (6) and (7).

$$\lambda_{k+1} = \Gamma_\lambda[\lambda_k - \eta_1(k) \nabla_\lambda L(\lambda_k, \theta_k)] \quad (6)$$

$$\theta_{k+1} = \Gamma_\theta[\theta_k - \eta_2(k) \nabla_\theta L(\lambda_k, \theta_k)] \quad (7)$$

In Eqs. (6) and (7), $\Gamma_\theta$ is a projection operator, which keeps the iterate $\theta_k$ stable by projecting onto a compact and convex set. $\Gamma_\lambda$ projects $\lambda$ into the range $[0, \lambda_{max}^4]$. $\nabla_\theta L$ and $\nabla_\lambda L$ are derived from Eq. (5), where the formulation for $\nabla_\theta L$ is derived using the log-likelihood trick shown in Eqs. (8) and (9).

$$\nabla_\theta L(\lambda, \theta) = \nabla_\theta E_{s \sim u}^{\pi\theta}[\log \pi(s, a; \theta)[R(s) - \lambda \times C(s)]] \quad (8)$$

$$\nabla_\lambda L(\lambda, \theta) = -(E_{s \sim u}^{\pi\theta}[C(s)] - \alpha) \quad (9)$$

Moreover, in Eqs. (6) and (7), $\eta_1(k)$ and $\eta_2(k)$ are step-sizes which ensure that the policy update is performed on a faster timescale than that of the penalty coefficient $\lambda$. This leads to the assumption shown in Eq. (10), which shows that the iterates $(\theta_n, \lambda_n)$ will converge to a fixed point (i.e., a local minima) that is a feasible solution.

$$\sum_{k=0}^{\infty} \eta_1(k) = \sum_{k=0}^{\infty} \eta_2(k) = \infty, \quad (10)$$

$$\sum_{k=0}^{\infty} (\eta_1(k)^2 + \eta_2(k)^2) < \infty \text{ and } \frac{\eta_1(k)}{\eta_2(k)} \rightarrow 0$$

The RCPO algorithm expands this process by using an actor-critic based approach, where the actor learns a policy $\pi$ and the critic learns the value using temporal-difference learning, i.e., through the recursive Bellman equation. More specifically, under the RCPO algorithm, the actor and critic are trained using an alternative, guiding penalty, referred to as a discounted penalty. The discounted penalty is defined as shown in Eq. (11).

$$V_{C_\gamma}^\pi(s) \triangleq E^\pi[\Sigma_{t=0}^\infty \gamma^t c(s_t, a_t) | s_0 = s] \quad (11)$$

In addition, the penalized reward functions are defined as shown in Eqs. (12) and (13).

$$\hat{r}(\lambda, s, a) \triangleq r(s, a) - \lambda c(s, a,) \quad (12)$$

$$\hat{V}^\pi(\lambda, s) \triangleq E^\pi[\Sigma_{t=0}^\infty \gamma^t \hat{r}(\lambda, s_t, a_t) | s_0 = s] = \Sigma^\pi[\Sigma_{t=0}^\infty \gamma^t (r(s_t, a_t) - \lambda c(s_t, a_t)) | s_0 = s] = V_R^\pi(s) - \lambda V_{C_\gamma}^\pi(s) \quad (13)$$

The penalized value of Eq. (13) can be estimated using a TD-learning critic. The RCPO algorithm is a three-timescale (constrained actor critic) process in which the actor and critic are updated after Eq. (13) is solved, and A is updated after Eq. (6) is solved. The RCPO algorithm converges to a feasible solution under the following conditions: (1) the set of feasible solutions is denoted by $\Theta = \{\theta : J_C^{\pi\theta} \leq \alpha\}$; (2) the set of local minima of $J_C^{\pi\theta}$ are denoted by $\Theta_\gamma$; and (3) assuming that $\Theta_\gamma \subseteq \Theta$, then the RCPO algorithm converges almost surely to a fixed point $(\theta^*(\lambda^*), v^*), v^*(\lambda^*), \lambda^*)$, which is a feasible solution.

In various embodiments, another actor-critic process may be used to fit the CRL model to the controlled application system. The steps that the control system may follow to perform this process are summarized as follows: (1) learn a Lagrange multiplier that fits the mathematical representation of the controlled application system using the gradient ascent method, where the gradient descent method is used for the main method (e.g., the actor-critic algorithm); and (2) formulate the mathematical representation as a CRL model using the learned Lagrange multiplier. This works due to the time separation property, i.e., the slow and fast time scales for the gradient descent method and the gradient ascent method. In various embodiments, this process may be applied for more generalized constraints using CDRL techniques. Moreover, this process is described in more detail in a paper entitled "An actor-critic algorithm for constrained Markov decision processes. *Systems & control letters*," by Borkar (2005).

At block 206, the processor automatically identifies a subset of the system state variables by selecting control action variables of interest and, for each control action variable of interest, identifying system state variables that drive the CRL model to recommend the control action variable of interest. In various embodiments, this step involves narrowing down thousands of variables to fewer than 10 or fewer than 20 variables, for example. Moreover, the identified subset of system state variables is described by the one or more constraint values and the cost-related variables associated with the constrained mathematical model.

In various embodiments, automatically identifying the subset of the system state variables at block 206 involves four steps. First, occupation measures for pairs of the control action variables and the system state variables, i.e., the state-action pairs described with respect to block 204, are calculated. The occupation measures are calculated as shown in Eq. (14).

$$x_{s_0}^\pi(s,u) = \frac{1}{T}\sum_{t=\{0,T\}} P_{s_0}^\pi \ (s=s_t, u=u_t) \tag{14}$$

This calculation is based on the state-action pair probabilities that were calculated during the model fitting process described with respect to block 204. The occupation for each state-action pair is representative of the frequency, between 0 and 1, at which that state-action pair was visited. In various embodiments, the occupation measures may be also be calculated during the model fitting process described with respect to block 204. Moreover, the occupation measure may be formulated with discount factor $\beta$ (to discount future rewards) and an infinite horizon, as shown in Eq. (15).

$$x_{s_0}^\pi(s,u) = (1-\beta)\Sigma_{t=\{0,T\to\infty\}}\beta^t \times P_{s_0}^\pi(s=s_t, u=u_t) \tag{15}$$

Second, the control system selects a number of control actions of interest, where each control action of interest is denoted by $u^i$. In some embodiments, the control actions of interest are manually selected by an operator of the control system. For example, a user interface of the control system may present the operator with a list of control actions from which the operator can conveniently choose, or the operator may manually type computer-readable identifications of the control actions of interest. In other embodiments, the control actions of interest are automatically selected by the control system in response to an automatically-generated indication of a triggering event that has been pre-programmed into the control system.

Third, the control system automatically determines the specific state-action pairs that include each control action of interest and have an occupation measure that complies with a predefined threshold. For example, for each control action of interest, the D state-action pairs (D≥1) having the highest occupation measures, i.e., $x_{s_0}^\pi(s,u^i)|_D$, may be determined. These state-action pairs are likely to include the system state variables that drive the CRL model to recommend the particular control action of interest, $u^i$. Fourth, the state-action pairs are broken down and analyzed to identify the specific subset of the system state variables that have the most substantial impact on driving the CRL model to recommend each control action of interest.

At block 208, the processor automatically performs state space dimensionality reduction of the CRL (or CDRL) model using the subset of the system state variables. This involves incorporating the subset of the system state variables identified at block 206 into the CRL model. In various embodiments, performing state space dimensionality reduction of the CRL model in this manner transforms the complex, large-sized stochastic problem into a more concise stochastic problem that can be quickly and efficiently solved by the control system.

At block 210, the processor estimates a transition probability matrix for a constrained Markov decision process (CMDP) model of the controlled application system subject to the one or more constraint values after state space dimensionality reduction. In various embodiments, this transition probability estimation process may be broken down into three steps. First, the processor analyzes the state space and the action space with as much coverage as possible. In other words, the processor analyzes as many transitions between different system states in response to different control actions as possible. For this purpose, the processor may run a simulation of the possible transitions using the control action variables of interest and the reduced set of system state variables, with a focus on the least used control action for each system state. Second, the processor estimates the transition probabilities by dividing the number of transitions for each change in system state for a particular control action by the overall number of control action variables and system state variables within the subset of variables. Third, the processor performs interpolation to generate the transition probability matrix. This may be accomplished by using neighboring system states for action-dependent system state variables and/or action-independent system state variables, and/or by performing an irreducibility guarantee method. The resulting transition probability matrix represents a concise model of the operation of the controlled application system (subject to the one or more constraint values) based on the subset of variables.

With reference now to a mathematical explanation of the transition probability estimation process, the set of control action variables is denoted by $N_a$, where the number of values for each control action variable is $N_a^i$, $1 \le i \le N_a$ and the total number of control action variables is $|U| = \Pi_{i=1}^{N_a} N_a^i$. The reduced set of system state variables is denoted by $N_s$, where the number of values for each system state variable is $N_s^j$, $1 \le j \le N_s$ and the total number of system state variables in the reduced set is $|X| = \Pi_{j=1}^{N_s} N_s^j$. The number of visits to system state j that were followed by control action i is denoted by $V_j^i$, $i \in U, j \in X$, and the number of transitions to system state k from system state j after control action i has been performed is denoted by $V_{jk}^i$, $i \in U, j \in X, k \in X$. With these definitions, the basic estimate of the transition probability matrix is shown in Eq. (16).

$$\hat{P}_{jk}^i = \frac{V_{jk}^i}{V_j^i}, i \in U, j \in X, k \in X \tag{16}$$

In various embodiments, system state variables are divided into two sets: controllable and non-controllable. For embodiments in which the controlled application system is a WWTP, the non-controllable system state variables may include, for example, influent flow, influent chemical load, and a type of time period according to electricity costs. Control actions and controllable system state variables do not affect transitions between non-controllable system state variables. Controllable system state variables describe internal or effluent characteristics of the controlled application system and can be affected by past actions and system state variables of any type. The number of non-controllable system state variables is denoted by I, $0 \leq I \leq N_s$, where the system state variables with indices $1, \ldots, I$ are the non-controllable ones. $X_N$ and $X_C$ are state spaces that correspond to non-controllable and controllable system state variables, respectively. The full state space is a Cartesian product of these two spaces, i.e., $X=X_N \times X_C$. Their dimensions are $|X_N|=\Pi_{i=1}^{I} N_s^i$ and are $|X_C|=\Pi_{i=I+1}^{N_s} N_s^i$, respectively. The set of system states from the state space that correspond to state j from the non-controllable state space, $X_N$, is defined as NS(j), $j \in X_N$. In other words, NS(j)={j}$\in X_C$. The set of system states from the state space that correspond to state j from the controllable state space, $X_c$, is defined as CS(j), $j \in X_C$. In other words, CS(j)=$X_N \in \{j\}$. Moreover, if $k \in X$, then $H(k) \in X_N$ denotes the non-controllable part of state k, and $E(k) \in X_C$ denotes the controllable part of state k. In other words, state k is the concatenation of states H(k) and E(k).

For action-driven coverage, assume that the current system state is j, $j \in X$. Choose the least chosen control action so far, i.e., $i^* = \mathrm{argmin}\, V_j^i$. If there are several such control actions, choose randomly between them according to uniform distribution. Similarly, for state-driven coverage, assume that the current system state is j, $j \in X$. The overall number of visits to system state k until the current time may be denoted by $\overline{V}_k = \Sigma_{i=1}^{|U|} V_k^i$. In addition, $W^i = \Sigma_{k=1}^{|X|} \hat{P}_{jk}^i / \overline{V}_k$, where $\hat{P}_{jk}^i$ is the current estimate of transition probabilities. Choose control action $i^* = \mathrm{argmax}\, W^i$. If there are several such control actions, choose randomly between them according to uniform distribution. State-driven coverage chooses control actions that imply visits to system states with high $1/\overline{V}_k$ or, in other words, rarely visited system states.

In various embodiments, this process is repeated using action-drive coverage for a relatively long period of time to get a reasonable initial estimate of the transition probabilities. Then, the process is repeated by alternating between action-driven and state-driven coverage.

For interpolation of the transition probability matrix, the first process involves interpolation based on neighboring system states. Neighboring system states of system state, j, $j \in X$, are the system states such that all system state variable values, except one, coincide with system state variables of j and difference by one system state variable is equal to one adjacent interval. The set of neighboring system states of state j, as well as system state j itself, is denoted by $L_j$. A subset of $L_j$ is denoted by $\tilde{L}_j^i$, which includes system states where control action i has been taken at least once. Moreover, $|\tilde{L}_j^i|$ denotes the size of this set.

Parameter $M \geq 0$ is used, and interpolation is performed for control actions and system states with $V_i^j \leq M$. A value of M=10 is typically used, and the interpolated probabilities are computed as shown in Eq. (17).

$$\tilde{P}_{jk}^i = \frac{\Sigma_{m \in \tilde{L}_j^i} \hat{P}_{mk}^i}{|\tilde{L}_j^i|}, k \in X \tag{17}$$

This process can be performed iteratively if the number of visits to adjacent system states, $\Sigma_{m \in L_j^i} V_{mi}$ replaces $V_j^i$ in the threshold criteria for system state, j, and control action, i.

The second process for interpolation of the transition probability matrix involves guaranteeing the irreducibility of the transition probability matrix. This is important because, if a transition probability matrix is not irreducible for some control action, i, then the optimization solution can imply that some system states are not visited under this control action, which is wrong for many controlled application systems. Therefore, the irreducibility guarantee method is used to address this problem. The irreducibility guarantee method uses parameter $\varepsilon$, $0 \leq \varepsilon \leq 1$, where $\varepsilon = 0.01$ is typically assumed. Given $s_0$ as the initial system state, the irreducibility guarantee method includes the following steps. First, for all control actions $i \in U$, the value of system states k and j are as shown in Eqs. (18) and (19), respectively.

$$k \in X, \tilde{P}_{s_0,k}^i = \max\left(\hat{P}_{s_0,k}^i, \frac{\varepsilon}{|X|}\right) \tag{18}$$

$$j \in X, \tilde{P}_{j,s_0}^i = \max\left(\hat{P}_{j,s_0}^i, \frac{\varepsilon}{|X|}\right) \tag{19}$$

A straightforward algorithm is then used to normalize the transition probabilities matrix, where the sum of all rows is equal to one.

In some embodiments, a third process may be used for interpolation of the transition probability matrix. Specifically, the transition probability obtained via the first and second process may include significant distortion with respect to the non-controllable system state variables. Therefore, interpolation of the non-controllable system state variables may be performed to correct the distortion. This process is described further in a paper entitled "Operational Optimization of Wastewater Treatment Plants: A CMDP Based Decomposition Approach," by Zadorojniy, Shwartz, Wasserkrug, and Zeltyn (2016).

At block 212, the processor formulates the CMDP model as a linear programming (LP) problem using the transition probability matrix, one or more cost objectives, and one or more constraints-related costs. In some embodiments, the LP problem may be formulated using Python/Optimization Programming Language (OPL), and then solved using the IBM CPLEX® Optimizer, for example. A mathematical explanation of block 212 is shown in Eqs. (20)-(25), where a non-zero entry corresponds to the initial system state.

$$\min_{x_{s_0}^\pi} c^T \times x_{s_0}^\pi \tag{20}$$

$$A \times x_{s_0}^\pi = b \tag{21}$$

$$\bar{d}^T \times x_{s_0}^\pi \leq \overline{ub} \tag{22}$$

$$x_{s_0}^\pi \geq 0 \tag{23}$$

$$A_{|S| \times |S||U|} = [I - \beta \times P(u_0), \ldots, I - \beta \times P(u_{|U|-1})] \tag{24}$$

$$b = (1 - \beta, 0, \ldots, 0)^T \tag{25}$$

The block diagram of FIG. 2 is not intended to indicate that the blocks 202-212 of the method 200 are to be executed in any particular order, or that all of the blocks 202-212 of the method 200 are to be included in every case. Moreover, any number of additional blocks may be included within the method 200, depending on the details of the specific implementation. For example, in some embodiments, the method 200 includes analyzing the LP problem to determine one or more control actions that will optimize the operation of the controlled application system subject to the one or more constraint values, and performing the one or more control actions via the control system. Furthermore, in some embodiments, the method 200 is performed multiple times, and the resulting LP problems are used to analyze a number of different predictive scenarios relating to an operation of the controlled application system. For example, the method 200 may be used to provide a prediction (or "what if" analysis) regarding the operation of the controlled application system under various different constraint values and/or various different types of constraints.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically reducing a dimensionality of a mathematical representation of a controlled application system that is subject to one or more constraint values, comprising:
   receiving, at a control system that directs an operation of the controlled application system, data corresponding to control action variables and system state variables relating to the controlled application system;
   fitting, via a processor of the control system, a constrained reinforcement learning (CRL) model to the controlled application system based on the data corresponding to the control action variables and the system state variables;
   automatically identifying, via the processor, a subset of the system state variables by selecting control action variables of interest and, for each control action variable of interest, identifying system state variables that drive the CRL model to recommend the control action variable of interest;
   automatically perform, via the processor, state space dimensionality reduction of the CRL model using the subset of the system state variables;
   estimating, via the processor, a transition probability matrix for a constrained Markov decision process (CMDP) model of the controlled application system subject to the one or more constraint values after state space dimensionality reduction; and
   formulating, via the processor, the CMDP model as a linear programming (LP) problem using the transition probability matrix, one or more cost objectives, and one or more constraints-related costs.

2. The method of claim 1, wherein the CRL model comprises a constrained deep reinforcement learning (CDRL) model.

3. The method of claim 1, comprising:
   solving, via the processor, the LP problem to determine one or more control actions that will optimize an operation of the controlled application system subject to the one or more constraint values; and
   performing the one or more control actions via the control system.

4. The method of claim 1, comprising at least one of:
   receiving at least a portion of the data from sensors coupled to the controlled application system; and
   computing, via the processor, at least a portion of the data based on simulations of the controlled application system.

5. The method of claim 1, wherein fitting the CRL model to the controlled application system comprises executing a reward constrained policy optimization (RCPO) process.

6. The method of claim 1, wherein fitting the CRL model to the controlled application system comprises:
   learning a Lagrange multiplier that fits the mathematical representation of the controlled application system using a gradient ascent method; and
   formulating the mathematical representation as a CRL model using the learned Lagrange multiplier.

7. The method of claim 1, wherein automatically identifying the subset of the system state variables comprises:
   calculating occupation measures relating to pairs of the control action variables and the system state variables;
   automatically determining specific pairs of the control action variables and the system state variables that include each control action variable of interest and have an occupation measure that complies with a predefined threshold; and
   analyzing the specific pairs of the control action variables and the system state variables to determine the subset of the system state variables that have a most substantial impact on driving the CRL model to recommend each control action variable of interest.

8. The method of claim 1, wherein estimating the transition probability matrix for the CMDP model comprises:
   analyzing a state space and an action space relating to the control action variables of interest and the subset of the system state variables;
   estimating transition probabilities by dividing a number of transitions for each change in a system state variable for a particular control action variable by an overall number of control action variables and system state variables within the control action variables of interest and the subset of the system state variables; and
   performing interpolation to generate the transition probability matrix by:
      using neighboring system states for at least one of action-dependent system state variables or action-independent system state variables; and/or
      performing an irreducibility guarantee method.

9. The method of claim 1, comprising solving, via the processor, the LP problem to analyze a plurality of different predictive scenarios relating to an operation of the controlled application system.

10. A control system that directs an operation of a controlled application system that is subject to one or more constraint values, comprising:
   an interface for receiving data corresponding to control action variables and system state variables relating to the controlled application system;
   a processor; and
   a computer-readable storage medium storing program instructions that direct the processor to:
      fit a constrained reinforcement learning (CRL) model to the controlled application system based on the data corresponding to the control action variables and the system state variables;
      automatically identify a subset of the system state variables by selecting control action variables of interest and, for each control action variable of interest, identifying system state variables that drive the CRL model to recommend the control action variable of interest;

automatically perform state space dimensionality reduction of the CRL model using the subset of the system state variables;

estimate a transition probability matrix for a constrained Markov decision process (CMDP) model of the controlled application system subject to the one or more constraint values after state space dimensionality reduction; and formulate the CMDP model as a linear programming (LP) problem using the transition probability matrix, one or more cost objectives, and one or more constraints-related costs.

11. The control system of claim 10, wherein the computer-readable storage medium stores program instructions that direct the processor to:

solve the LP problem to determine one or more control actions that will optimize an operation of the controlled application system subject to the one or more constraint values; and perform the one or more control actions via the control system.

12. The control system of claim 10, wherein the CRL model comprises a constrained deep reinforcement learning (CDRL) model.

13. The control system of claim 10, wherein the controlled application system comprises a wastewater treatment plant (WWTP), and wherein the one or more constraint values comprises at least one of a limit on a total nitrogen concentration or a limit on a total phosphorus concentration of an effluent generated by the WWTP.

14. The control system of claim 10, wherein the computer-readable storage medium stores program instructions that direct the processor to fit the CRL model to the controlled application system by executing a reward constrained policy optimization (RCPO) process.

15. The control system of claim 10, wherein the computer-readable storage medium stores program instructions that direct the processor to fit the CRL model to the controlled application system by:

learning a Lagrange multiplier that fits a mathematical representation of the controlled application system using a gradient ascent method; and formulating the mathematical representation as a CRL model using the learned Lagrange multiplier.

16. The control system of claim 10, wherein the computer-readable storage medium stores program instructions that direct the processor to identify the subset of the system state variables by:

calculating occupation measures relating to pairs of the control action variables and the system state variables;

automatically determining specific pairs of the control action variables and the system state variables that include each control action variable of interest and have an occupation measure that complies with a predefined threshold; and analyzing the specific pairs of the control action variables and the system state variables to determine the subset of the system state variables that have a most substantial impact on driving the CRL model to recommend each control action variable of interest.

17. The control system of claim 10, wherein the computer-readable storage medium stores program instructions that direct the processor to estimate the transition probability matrix for the CMDP model by:

analyzing a state space and an action space relating to the control action variables of interest and the subset of the system state variables;

estimating transition probabilities by dividing a number of transitions for each change in a system state variable for a particular control action variable by an overall number of control action variables and system state variables within the control action variables of interest and the subset of the system state variables; and performing interpolation to generate the transition probability matrix by:
using neighboring system states for at least one of action-dependent system state variables or action-independent system state variables; and/or
performing an irreducibility guarantee method.

18. The control system of claim 10, wherein the computer-readable storage medium stores program instructions that direct the processor to analyze a plurality of different predictive scenarios relating to an operation of the controlled application system by solving the LP problem.

19. The control system of claim 10, wherein the computer-readable storage medium stores program instructions that direct the processor to compute at least a portion of the data based on simulations of the controlled application system.

20. A computer program product for automatically reducing a dimensionality of a mathematical representation of a controlled application system that is subject to one or more constraint values, comprising a computer-readable storage medium having program instructions embodied therewith, wherein the computer-readable storage medium is not a transitory signal per se, and wherein the program instructions are executable by a processor to cause the processor to:

fit a constrained reinforcement learning (CRL) model to the controlled application system, wherein the CRL model is based on data corresponding to the control action variables and the system state variables;

automatically identify a subset of the system state variables by selecting control action variables of interest and, for each control action variable of interest, identifying system state variables that drive the CRL model to recommend the control action variable of interest;

automatically perform state space dimensionality reduction of the CRL model using the subset of the system state variables;

estimate a transition probability matrix for a constrained Markov decision process (CMDP) model of the controlled application system subject to the one or more constraint values after state space dimensionality reduction; and formulate the CMDP model as a linear programming (LP) problem using the transition probability matrix, one or more cost objectives, and one or more constraints-related costs.

* * * * *